US007959233B2

(12) United States Patent
Sweers et al.

(10) Patent No.: US 7,959,233 B2
(45) Date of Patent: Jun. 14, 2011

(54) SEAT BACK ASSEMBLY WITH INTEGRAL REINFORCEMENT STRUCTURE

(75) Inventors: Michael Sweers, Williamston, MI (US); Itoh Daisuke, Ann Arbor, MI (US); Michael John Ebel, Brighton, MI (US); Lindsay Anne-Allor Babian, Canton, MI (US); Gregory Todd Donovan, Britton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/339,862

(22) Filed: Dec. 19, 2008

(65) Prior Publication Data

US 2010/0156162 A1 Jun. 24, 2010

(51) Int. Cl.
*A47C 7/02* (2006.01)

(52) U.S. Cl. .................................................. 297/452.18

(58) Field of Classification Search ............. 297/378.14, 297/378.13, 216.13, 216.14, 452.18, 216.1, 297/452.2, DIG. 2; 296/63, 66, 65.03, 68.1
See application file for complete search history.

(56) References Cited

U.S. PATENT DOCUMENTS 3,511,535 A 5/1970 Gunlock
3,944,276 A * 3/1976 de Rosa et al. ............ 296/65.13
4,109,959 A 8/1978 Barecki et al.
4,568,124 A 2/1986 Kanai et al.
5,468,053 A 11/1995 Thompson et al.
5,542,747 A 8/1996 Burchi
5,676,423 A 10/1997 Pedronno et al.
5,700,058 A * 12/1997 Balagurumurthy et al. ........................ 297/440.15
5,786,394 A 7/1998 Slaven
5,951,110 A 9/1999 Conner et al.
5,988,757 A 11/1999 Vishey et al.
6,003,937 A 12/1999 Dutton et al.
6,027,171 A 2/2000 Partington et al.
6,213,557 B1 4/2001 Aebischer et al.
6,299,239 B1 * 10/2001 Sagawa et al. ........... 296/187.12
6,409,269 B1 6/2002 Aebischer et al.
6,491,346 B1 12/2002 Gupta et al.
6,540,192 B2 * 4/2003 Ouellet ......................... 248/461
6,733,064 B2 5/2004 Fox et al.
7,137,670 B2 11/2006 Gupta et al.
7,290,837 B2 11/2007 Sugiyama et al.
7,585,030 B2 * 9/2009 Galbreath et al. ....... 297/452.27
2003/0116993 A1 6/2003 Skarb et al.
2004/0084937 A1 * 5/2004 Berta ....................... 297/180.14
2005/0146190 A1 7/2005 Taatjes
2005/0173903 A1 8/2005 Mellor
2008/0018162 A1 1/2008 Galbreath et al.
2008/0042482 A1 2/2008 Weiss et al.
2008/0145635 A1 6/2008 Stoll et al.

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

A seat back assembly including a frame formed of a low density material such as expanded polypropylene (EPP) and a reinforcement structure encapsulated within the frame is provided. The reinforcement structure includes a load transferring surface extending between opposite ends of the seat back. Each end of the reinforcement structure is secured to a vehicle body structure. The reinforcement structure transfers a load placed upon the seat back assembly throughout the frame so as to maintain the structural integrity of the frame under a predetermined load. Specifically, the load transferring surface of the reinforcement structure is in contact with the frame and transfers the load across a predetermined area of the frame and to the vehicle body.

4 Claims, 4 Drawing Sheets

10
26
26
20
12
32
34
28
22
22
26
Cargo 10
12
20
22
22
26
26
26
28
32
34
Cargo

SEAT BACK ASSEMBLY WITH INTEGRAL REINFORCEMENT STRUCTURE

FIELD OF THE INVENTION

The present invention related to a seat back assembly including a frame molded from a low density material such as expanded polypropylene. The seat back assembly further includes a reinforcement structure encapsulated within the frame so as to provide support for the frame and transfer a load throughout the frame and to the vehicle body.

BACKGROUND OF THE INVENTION

Mass reduction in vehicle parts and components lowers the rate of the vehicle's fuel consumption. Thus different materials are considered to form vehicle structure which may be lighter in weight than steel or metal, but yet provide the sufficient structural strength for body support. In particular, it is known to replace metal frames for vehicle components such as seat assemblies with polyurethane, or polypropylene.

Polypropylene has sufficient compression and tensile strength to replace the metal in the manufacture of the seat back assembly frame. Indeed, some vehicle seat backs have done so. Expanded polypropylene (EPP) is generally polypropylene that has been expanded using gas injection during the molding process. EPP has a lower density than polypropylene and thus weighs less than the same volume of polypropylene. Thus it remains desirable to reduce the mass of a seat back assembly by using a frame than is lighter than metal, but yet has sufficient structural integrity so as to withstand the load associated with vehicle operation.

Another aspect of vehicle design is maintaining the structural integrity of a vehicle component during normal operating conditions. In the course of normal vehicle operation, EPP structure may become damaged due to the load. For instance, the interior of a vehicle frank may experience a load due to articles contained therein shifting during vehicle operation.

In sedan type vehicles, the seat back assembly may back up to the trunk space. As often the case, the trunk space may contain articles such as groceries and the like. These articles may shift while the vehicle is being driven. In some cases, such as a quick stop, the articles may be forced into contact with the seat back assembly. Such a load may damage the seat back assembly.

It is known to protect the seat back assembly from such damage by using a panel made of hardened resin, or metal. In other instances, the seat back frame may be composed of metal and include reinforcement structures such as a bar. In yet another example of a seat back reinforcement is the use of a rib on a panel of a seat back. The rib helps the panel maintain its structural integrity by providing added rigidity to the panel. However such seat assemblies require a substantial amount of mass or are costly to manufacture. Accordingly, it remains desirable to provide a seat assembly with minimal mass and relatively inexpensive to manufacture.

SUMMARY OF THE INVENTION AND ADVANTAGES

A seat back assembly including a frame formed of a low density material such as expanded polypropylene (EPP) and a reinforcement structure encapsulated within the frame is provided. The reinforcement structure includes a load transferring surface extending between opposite ends of the seat back. Each end of the reinforcement structure is secured to a vehicle body structure.

The reinforcement structure transfers a load placed upon the seat back assembly throughout the frame so as to maintain the structural integrity of the frame under a predetermined load. Specifically, the load transferring surface of the reinforcement structure is in contact with the frame and transfers the load across a predetermined area of the frame and to the vehicle body.

BRIEF DESCRIPTION OF THE DRAWINGS

Other advantages of the present invention will be readily appreciated, as the same becomes better understood by reference to the following detailed description when considered in connection with the accompanying drawings wherein.

Figure 6:
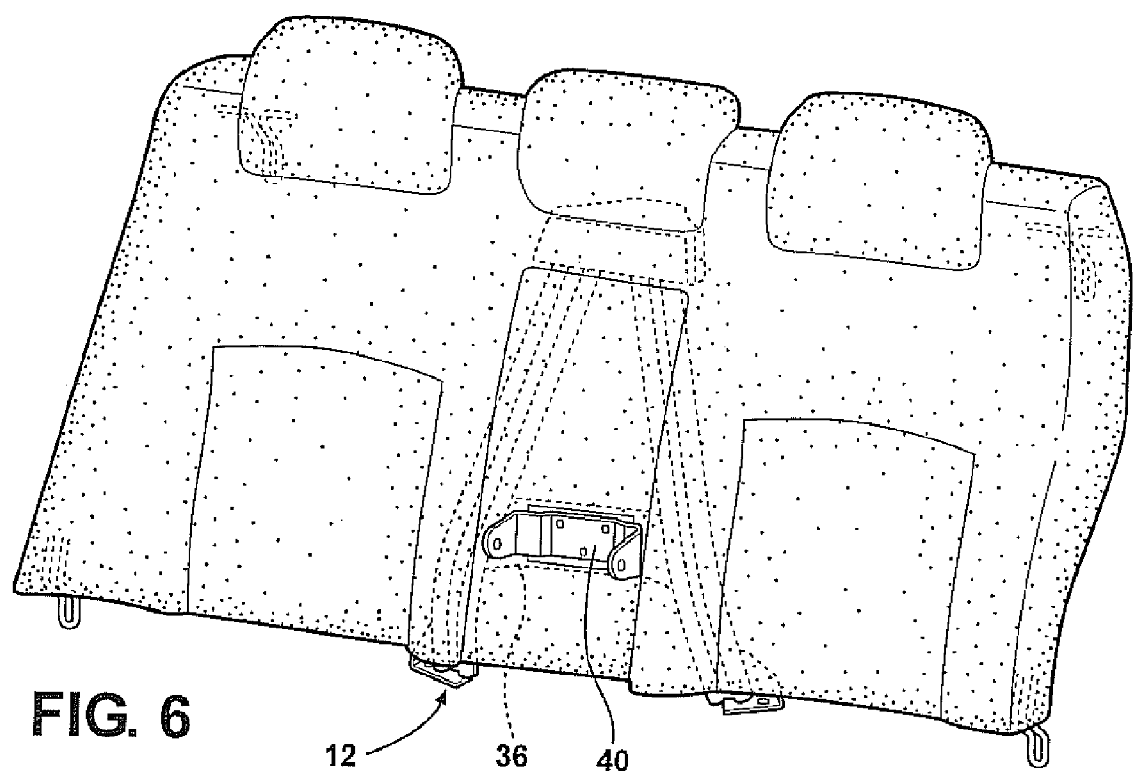
Figure 4:
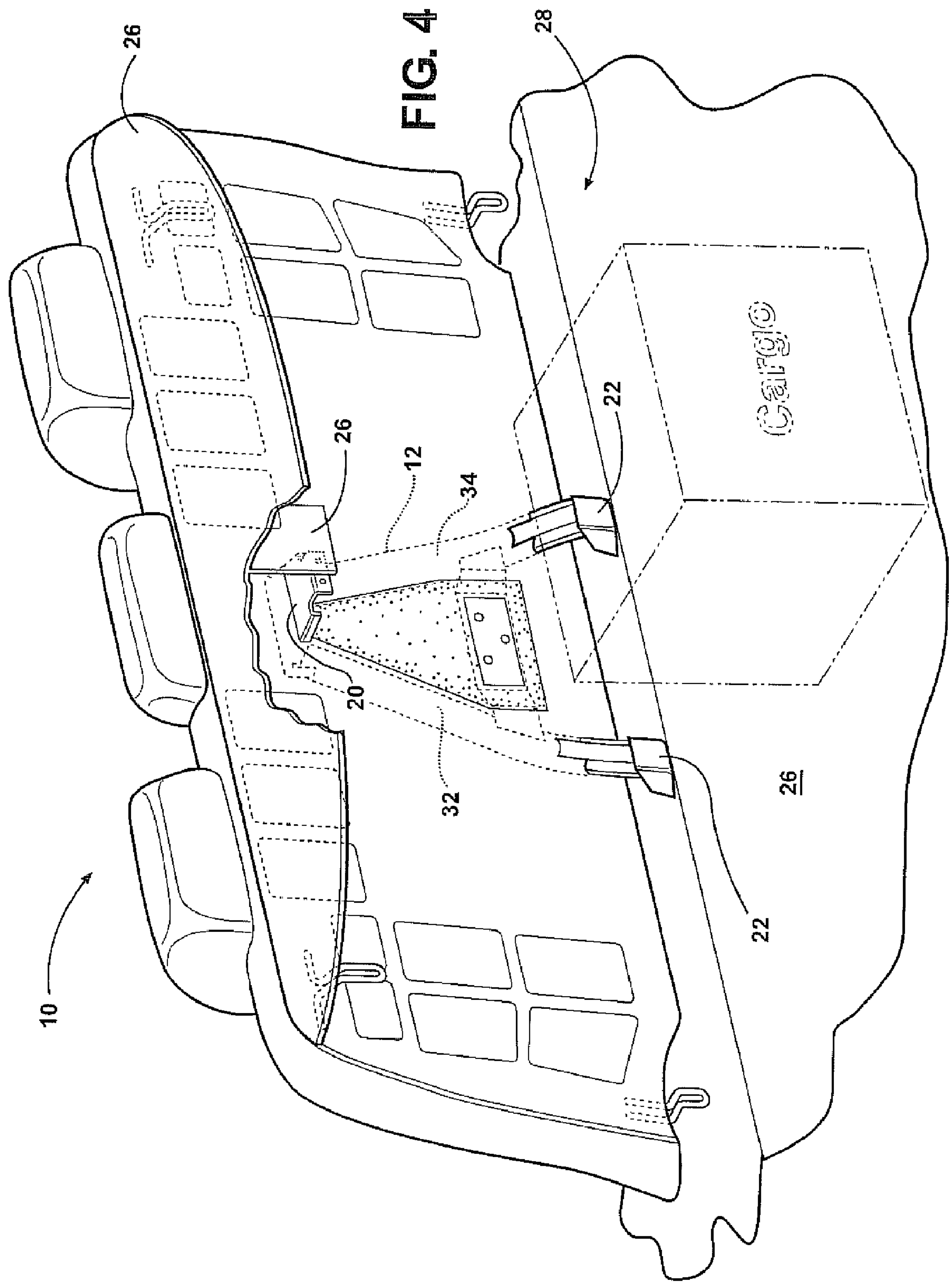
Figure 5:
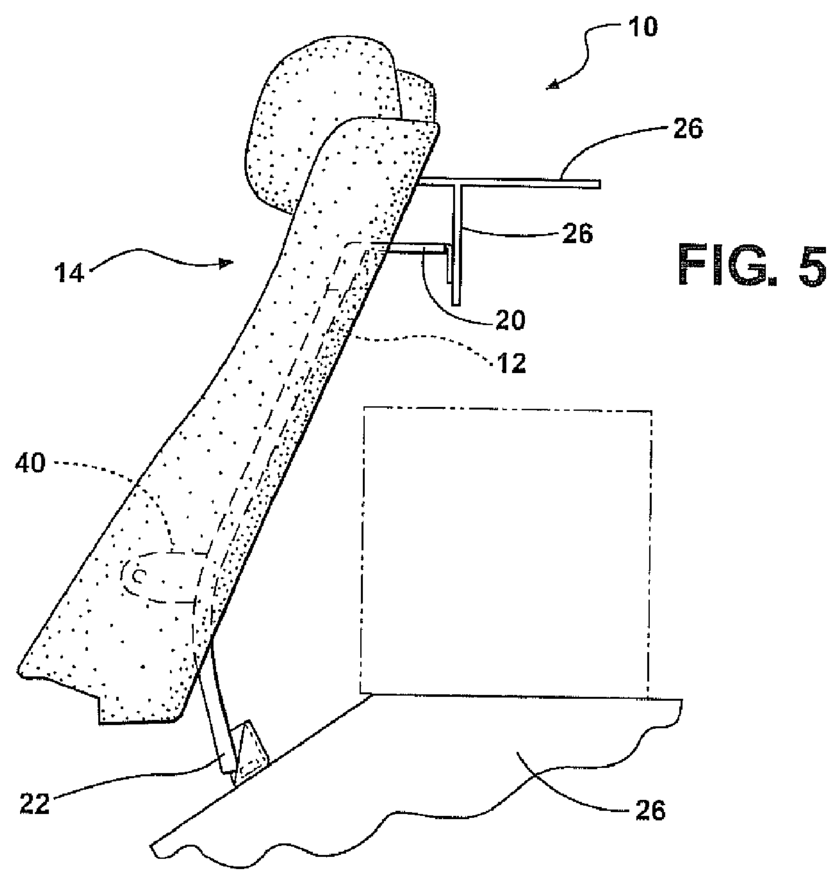
Figure 7:
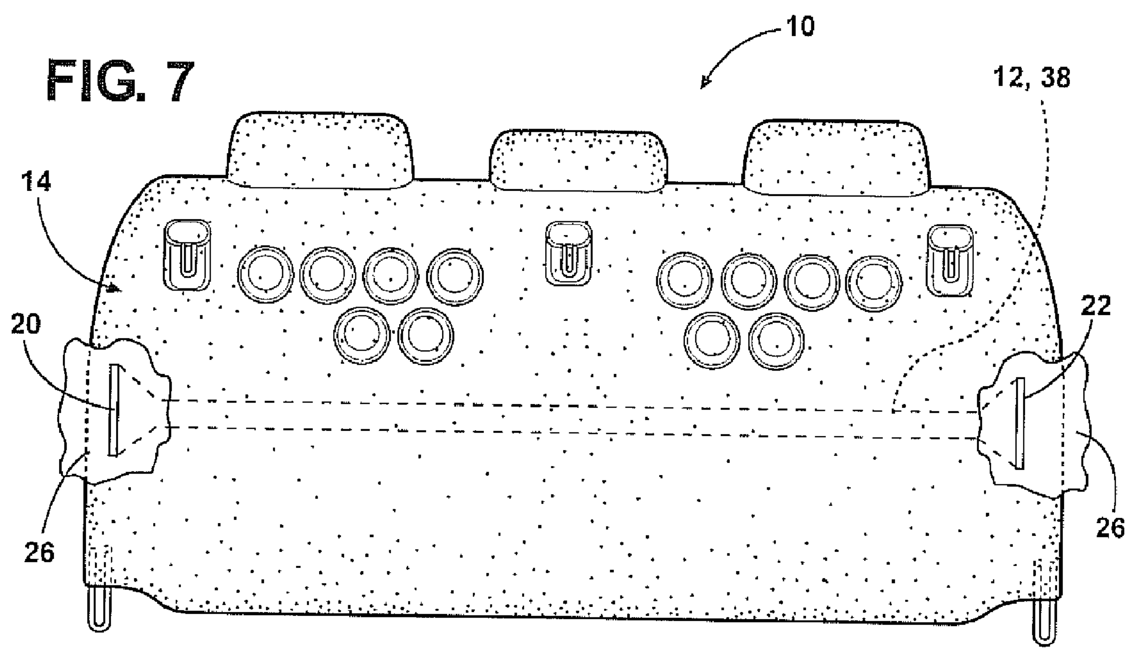

side view of the seat back assembly fixed to vehicle body structure;

FIG. 4 is a perspective view of the seat back assembly, wherein the back wall of the seat back forms an inner wall of the trunk, the reinforcement structure is secured to the ceiling of the trunk on one end, and the trunk floor on the other end;

FIG. 5 is a perspective side view of FIG. 4 showing trunk cargo advancing towards the seat assembly;

FIG. 6 is a view of a preferred embodiment of the reinforcement structure, wherein the reinforcement structure is generally an "A" shaped frame, the bar extending between the two legs includes mounting brackets for an armrest; and FIG. 7 is a view of a second preferred embodiment of the reinforcement structure.

DETAILED DESCRIPTION OF THE INVENTION

Referring to the Figures, wherein like numerals indicate corresponding parts throughout the several views, a seat back assembly 10 with a reinforcement structure 12 is provided. The seat back assembly 10 includes a frame 14 constructed from a low density material such as expanded polypropylene (EPP). EPP provides a low mass alternative to metal seat frames 14. A reinforcement structure 12 is encapsulated within the frame 14 so as to transfer a load.

Figure 1:
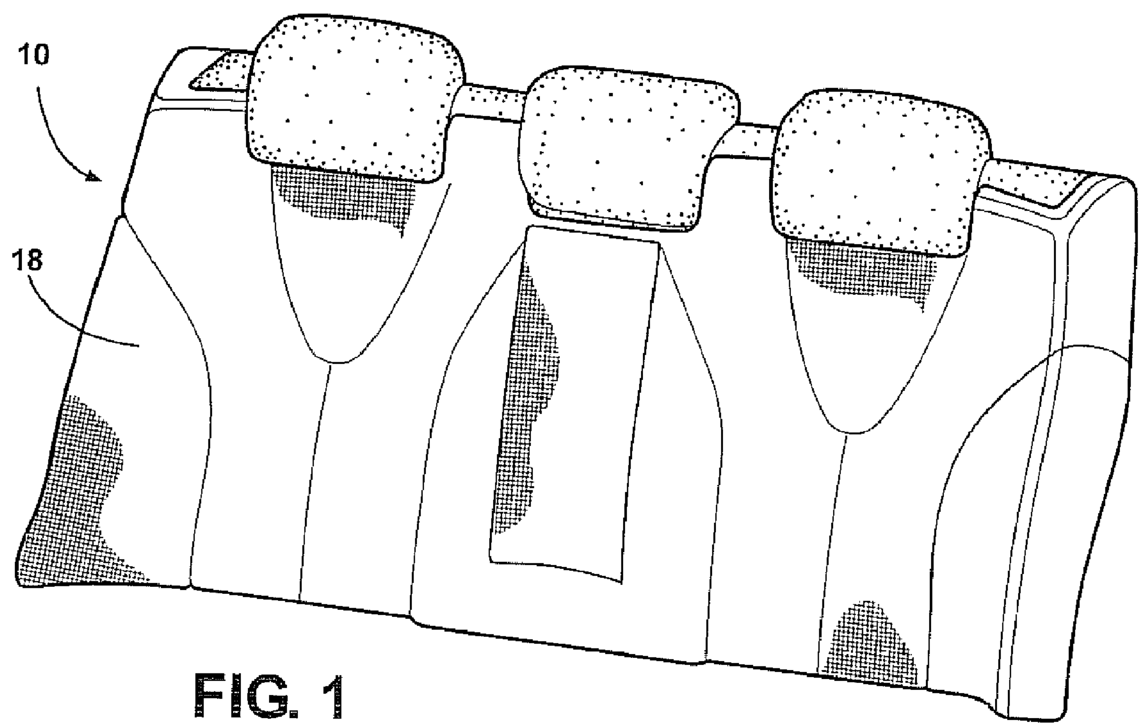
FIG. 1 is a view of front of the seat back assembly according to an embodiment of the present invention, showing the reinforcement bar encapsulated within the frame.
Figure 2:
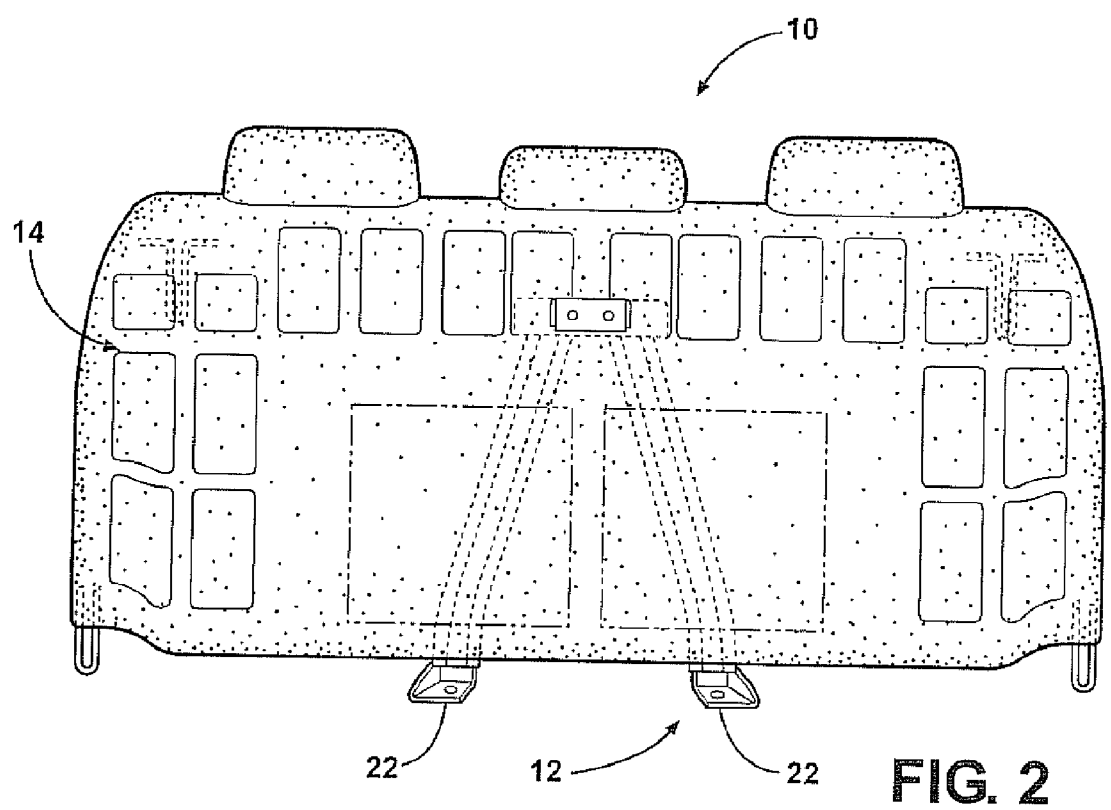
FIG. 2 is a view of the back side of the seat back of FIG. 1.
Figure 3:
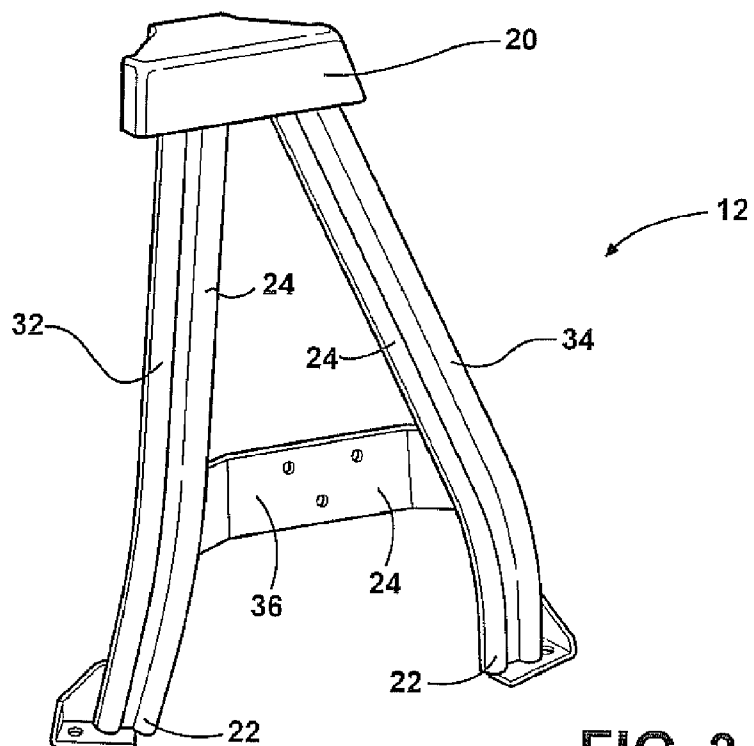
FIG. 3 is an isolated view of an embodiment of the reinforcement structure.

With reference now to FIG. 1, a view of the assembled seat back assembly 10 is provided. The seat back assembly 10 may include other features for occupant comfort such as a cushion body (not shown) or trim cover 18. The cushion body is laid on top of the frame 14 and covered with the trim cover 18.

With reference now to FIGS. 2, 3, 4, and 5, the reinforcement structure 12 has a first end 20 opposite a second end 22. The reinforcement structure 12 further includes a load transferring surface 24 extending between the first and second ends 20, 22. Each end of the reinforcement structure 12 is fixedly secured to the vehicle body structure 26. The load transferring surface 24 of the reinforcement structure 12 is encapsulated within the frame 14. Thus the load transferring surface 24 is in contact with the frame 14 so as to transfer a load throughout the frame 14 and to the vehicle body 26.

With reference again to FIGS. 4 and 5, the seat back assembly 10 may be mounted in the vehicle so as to form a wall of the trunk 28. Thus, the back surface of the seat back assembly 10 is exposed to loads arising from shifting cargo. The reinforcement structure 12 is provided so as to prevent damage to the seat back assembly 10 as a result of shifting cargo. In particular, the reinforcement structure 12 is configured so as to transfer a load coming from the back of the vehicle towards the front.

The reinforcement structure 12 may be encapsulated within the frame 14 during the molding process using known molding techniques. For instance, the reinforcement structure 12 may be placed in the center of a clamshell mold configured to hold the reinforcement structure 12 in a predetermined position. The EPP may then be injected into the mold so as to encapsulate the reinforcement structure 12 within the frame 14.

The frame 14 is then secured to vehicle body structure 26 so as to provide the reinforcement structure 12 with rigid support. Thus, the load experienced by the reinforcement structure 12 is not only transferred along the load transferring surface 24 to the frame 14, but also to the attached vehicle body structure 26.

With reference again to FIG. 3, a preferred embodiment of the reinforcement structure 12 is provided. The reinforcement structure 12 includes a first leg 32, a second leg 34, and a bar 36. The first and second leg 32, 34 are joined together at one end and are spaced apart from each other at the other end, and the bar 36 extends between both legs 32, 34 so as to form a generally "A" shaped reinforcement structure 12. The load transferring surface 24 of the "A" shaped reinforcement structure 12 is encapsulated within the frame 14. The spaced apart leg portions and the joined leg portions both protrude from the frame 14 and are both fixedly attached to vehicle body structure 26.

The reinforcement structure 12 may include flanges integrally formed to both ends 20, 22 of each leg so as to provide a surface for securing the leg to the vehicle body structure 26. Preferably the reinforcement structure 12 is made of a structural material such as metal or a polymer composite such as carbon and/or glass fiber.

With reference now to FIG. 7, a second preferred embodiment of the reinforcement structure 12 is provided. The reinforcement structure 12 is a generally elongated member 38 that extends between opposite ends of the seat back assembly 10. For instance, the elongated member 38 may extend between opposing wheel wells, or diagonally across the seat back assembly 10 between the trunk 28 floor and trunk 28 ceiling, or may extend along a generally vertical plane between the trunk 28 floor and trunk 28 ceiling. The elongated member 38 has a first end 20 opposite a second end 22. A portion of the elongated member 38 is fully encapsulated in the EPP frame 14, and the first and second ends 20, 22 protrude from the frame and are mounted to the vehicle body structure 26.

The reinforcement structure 12 may also include other features such as an armrest bracket 40 for mounting an armrest onto the front side of the seat back assembly 10. With reference now to FIG. 6, the bar 36 of the "A" shaped reinforcement structure 12 includes a pair of spaced apart armrest brackets 40 configured to receive an armrest assembly. As shown in the figure, the reinforcement structure 12 is encapsulated within the frame 14 in such a manner that the armrest bracket 40 protrudes outwardly from the cabin space surface of the seat back assembly 10. The armrest assembly may be mounted thereto.

Obviously, many modifications and variations of the present invention are possible in light of the above teachings and may be practiced otherwise than as specifically described while within the scope of the appended claims.

What is claimed is:

1. A seat back assembly mounted to a vehicle body, the seat back assembly comprising:

a frame formed of expanded polypropylene; and a reinforcement structure having a first end opposite and spaced apart from a second end, the reinforcement structure further having a first leg, a second leg, and a bar, wherein the first and second leg are joined together at the first end and the first and second legs are spaced apart from each other at the second end, and wherein the bar extends between both legs so as to form a generally "A" shaped reinforcement structure, and the first and second ends are mounted to the vehicle body.

2. The seat back assembly as set forth in claim 1, wherein the "A" shaped reinforcement structure is made of metal.

3. The seat back assembly as set forth in claim 2, wherein the bar includes an armrest bracket protruding from the frame, the armrest bracket configured to secure an armrest.

4. The seat back assembly as set forth in claim 2, wherein both ends of the first and second legs of the "A" shaped reinforcement structure protrude from the expanded polypropylene frame.

* * * * *

UNITED STATES PATENT AND TRADEMARK OFFICE

CERTIFICATE OF CORRECTION

PATENT NO. : 7,959,233 B2
APPLICATION NO. : 12/339862
DATED : June 14, 2011
INVENTOR(S) : Sweers et al.

It is certified that error appears in the above-identified patent and that said Letters Patent is hereby corrected as shown below:

Column 1, line 37 replace "frank" with --trunk--

Signed and Sealed this
Thirteenth Day of September, 2011

David J. Kappos
*Director of the United States Patent and Trademark Office*

UNITED STATES PATENT AND TRADEMARK OFFICE

CERTIFICATE OF CORRECTION

PATENT NO. : 7,959,233 B2
APPLICATION NO. : 12/339862
DATED : June 14, 2011
INVENTOR(S) : Sweers et al.

It is certified that error appears in the above-identified patent and that said Letters Patent is hereby corrected as shown below:

Column 1, line 37 replace "frank" with --trunk--

Signed and Sealed this
Twenty-seventh Day of September, 2011

David J. Kappos
*Director of the United States Patent and Trademark Office*